US010191919B2

(12) United States Patent
Haro et al.

(10) Patent No.: US 10,191,919 B2
(45) Date of Patent: Jan. 29, 2019

(54) METHOD AND APPARATUS FOR PRESENTING POINT OF INTEREST CHANGES

(71) Applicant: HERE Global B.V., Veldhoven (NL)

(72) Inventors: Antonio Haro, Hercules, CA (US); Craig Barnes, Forest Park, IL (US)

(73) Assignee: HERE GLOBAL B.V., Veldhoven (NL)

( * ) Notice: Subject to any disclaimer, the term of this patent is extended or adjusted under 35 U.S.C. 154(b) by 826 days.

(21) Appl. No.: 14/660,054

(22) Filed: Mar. 17, 2015

(65) Prior Publication Data
US 2016/0275102 A1    Sep. 22, 2016

(51) Int. Cl.
G06F 7/00       (2006.01)
G06F 17/30      (2006.01)

(52) U.S. Cl.
CPC .. *G06F 17/30241* (2013.01); *G06F 17/30572* (2013.01); *G06F 17/30554* (2013.01)

(58) Field of Classification Search
CPC ......... G06F 17/30241; G06F 17/30554; G06F 17/3087; G06F 17/30867; G06F 3/04842; G06F 3/0482; G06F 17/30572
USPC ....................................................... 707/722
See application file for complete search history.

(56) References Cited

U.S. PATENT DOCUMENTS 7,486,958 B2    2/2009  Cheha et al.
7,831,628 B1 *  11/2010 Silva ................. G06Q 30/0283
                                              705/400
8,290,704 B2    10/2012 Bai et al.
2002/0010591 A1* 1/2002 Pomerance ........... G06Q 10/10
                                              705/309

(Continued)

FOREIGN PATENT DOCUMENTS

CN    103177189 A     6/2013
WO    2012091250 A1   7/2012
WO    2013132111 A1   9/2013

OTHER PUBLICATIONS

Oku et al., "Method for Making Temporal Features of POIs for Geographical Recommendation", The 6th International Conference on Soft Computing and Intelligent Systems (SCIS 2012) / The 13th International Symposium on Advanced Intelligent Systems (ISAIS 2012), Kobe Convention Center, Japan, 2012, 4 Pages.

(Continued)

*Primary Examiner* — Binh V Ho
(74) *Attorney, Agent, or Firm* — Ditthavong & Steiner, P. C.

(57) ABSTRACT

An approach is provided for processing status information for one or more points of interest to determine the changes for generation of various representations for presenting in a user interface. The approach involves processing and/or facilitating a processing of status information associated with one or more points of interest to determine one or more point-of-interest changes. The approach also involves causing, at least in part, a generation of one or more representations of the one or more point-of-interest changes, one or more transitions between the one or more point-of-interest changes, or a combination thereof. The approach further involves causing, at least in part, a presentation of the one or more representations in at least one point-of-interest user interface.

17 Claims, 16 Drawing Sheets

(56) References Cited

U.S. PATENT DOCUMENTS

| | | | |
|---|---|---|---|
| 2003/0078035 A1* | 4/2003 | Sheha | H04L 29/12066 455/414.1 |
| 2007/0118831 A1* | 5/2007 | Kondo | E05B 47/0009 717/121 |
| 2009/0094077 A1* | 4/2009 | Fosburgh | G06Q 10/00 705/315 |
| 2009/0177384 A1* | 7/2009 | Walder | G01C 21/3682 701/532 |
| 2009/0271400 A1* | 10/2009 | Uchida | G01C 21/32 |
| 2010/0161215 A1* | 6/2010 | Karani | G01C 21/3679 701/465 |
| 2010/0174481 A1* | 7/2010 | Kang | G01C 21/3644 701/533 |
| 2011/0238609 A1 | 9/2011 | Aben et al. | |
| 2012/0066240 A1* | 3/2012 | Morimoto | G06F 17/30241 707/758 |
| 2013/0036031 A1* | 2/2013 | Hutchinson | G06Q 10/10 705/30 |
| 2013/0093787 A1* | 4/2013 | Fulks | G06T 11/60 345/629 |
| 2013/0103697 A1* | 4/2013 | Hill | G06F 17/30312 707/748 |
| 2013/0150087 A1 | 6/2013 | Kosuru et al. | |
| 2013/0166196 A1 | 6/2013 | Narasimha et al. | |
| 2014/0019148 A1* | 1/2014 | Buzz | G06Q 10/06 705/1.1 |
| 2014/0059060 A1 | 2/2014 | Yang et al. | |
| 2014/0113559 A1 | 4/2014 | Cline et al. | |
| 2014/0137071 A1* | 5/2014 | Wadhwani | G06F 11/3604 717/101 |
| 2014/0180830 A1 | 6/2014 | Ishii et al. | |
| 2014/0331200 A1* | 11/2014 | Wadhwani | G06F 11/3604 717/101 |
| 2015/0178866 A1* | 6/2015 | Serio | G06Q 50/163 705/314 |
| 2015/0235322 A1* | 8/2015 | Emison | G06Q 40/08 705/4 |
| 2016/0055594 A1* | 2/2016 | Emison | G06Q 40/08 705/4 |

OTHER PUBLICATIONS

"PoiEdit Pocket V1.0", Mobilism.me, Feb. 23, 2009, 2 pages.

McCoy, "Interactive map highlights last week's building permits", ArgusLeader.com, Mar. 22, 2014, 1 Page.

* cited by examiner

Example public city building permit data for ABC location. Each permit has a date, description of work and location of work. This includes construction permit data.

| | | | | | | | | | |
|---|---|---|---|---|---|---|---|---|---|
| 100505735 | PERMIT – WRECKING/ DEMOLITION | 8/27/13 | $1.00 | 118 | W | 103RD | ST | WRECK AND REMOVE A 1 STORY BRICK COMMERCIAL BUILDING. | 41.70723209, -87.6267735 |
| 100503855 | PERMIT – WRECKING/ DEMOLITION | 8/27/13 | $1.00 | 6140 | N | BROADWAY | | WRECK AND REMOVE A 1 STORY MASONRY COMMERCIAL BUILDING | 41.99352101, -87.66052299 |

FIG. 7A

Example public city building permit data for ABC location. Each permit has a date, description of work and location of work. This includes demolition permit data.

| | | | | | | |
|---|---|---|---|---|---|---|
| 8/22/13 | 1415 | W | 44TH | ST | INTERIOR ALTERATIONS - NEW OFFICE AND PRODUCTION SHOP WITH ASSOCIATED M.E.P WORK AS PER PLANS | 41.81402062, -87.66091401 |
| 8/22/13 | 1024 | W | ARGYLE | ST | INTERIOR RENOVATION FOR NEW RETAIL SMOOTHIE SHOP(NEW SERVICE COUNTER & SERVICE SINKS) AS PER PLANS**CERTIFIED CORRECTIONS- - SUBJECT TO FIELD INSPECTIONS & AUDIT ** | 41.97340592, -87.65601158 |

FIG. 7B

METHOD AND APPARATUS FOR PRESENTING POINT OF INTEREST CHANGES

BACKGROUND

Service providers and device manufacturers (e.g., wireless, cellular, etc.) are continually challenged to deliver value and convenience to consumers by, for example, providing compelling network services. One area of interest has been the development of mapping applications and navigation services with visual representations (e.g. business icons, landmarks, etc.) as a means of conveying information. However, when displaying mapping and/or navigation information for users, there is currently little or no information concerning on-going changes for particular locations (e.g. business closing, opening soon, etc.). This problem may be particularly acute for users accessing information for locations undergoing rapid change or development (e.g. construction areas, high business turnover areas, etc.). Accordingly, service providers and developers face significant technical challenges in incorporating real-time updates for a point-of-interest in mapping and/or navigation applications.

SOME EXAMPLE EMBODIMENTS

Therefore, there is a need for an approach for processing status information for one or more points of interest to determine the changes for generation of various representations for presenting in a user interface.

According to one embodiment, a method comprises processing and/or facilitating a processing of status information associated with one or more points of interest to determine one or more point-of-interest changes. The method also comprises causing, at least in part, a generation of one or more representations of the one or more point-of-interest changes, one or more transitions between the one or more point-of-interest changes, or a combination thereof. The method further comprises causing, at least in part, a presentation of the one or more representations in at least one point-of-interest user interface.

According to another embodiment, an apparatus comprises at least one processor, and at least one memory including computer program code, the at least one memory and the computer program code configured to, with the at least one processor, cause, at least in part, the apparatus to process and/or facilitate a processing of status information associated with one or more points of interest to determine one or more point-of-interest changes. The apparatus is also caused to cause, at least in part, a generation of one or more representations of the one or more point-of-interest changes, one or more transitions between the one or more point-of-interest changes, or a combination thereof. The apparatus is further caused to cause, at least in part, a presentation of the one or more representations in at least one point-of-interest user interface.

According to another embodiment, a computer-readable storage medium carries one or more sequences of one or more instructions which, when executed by one or more processors, cause, at least in part, an apparatus to process and/or facilitate a processing of status information associated with one or more points of interest to determine one or more point-of-interest changes. The apparatus is also caused to cause, at least in part, a generation of one or more representations of the one or more point-of-interest changes, one or more transitions between the one or more point-of-interest changes, or a combination thereof. The apparatus is further caused to cause, at least in part, a presentation of the one or more representations in at least one point-of-interest user interface.

According to another embodiment, an apparatus comprises means for processing and/or facilitating a processing of status information associated with one or more points of interest to determine one or more point-of-interest changes. The apparatus also comprises means for causing, at least in part, a generation of one or more representations of the one or more point-of-interest changes, one or more transitions between the one or more point-of-interest changes, or a combination thereof. The apparatus further comprises means for causing, at least in part, a presentation of the one or more representations in at least one point-of-interest user interface.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7 A-B are diagrams of examples of city permit data that may be extracted to indicate change in a point-of-interest user interface, according to one embodiment;

FIG. 9 B is a diagram of visual representations of the changing status of a point-of-interest over time as represented by a transparency change, according to one embodiment;

FIG. 9 C is a diagram of visual representations of the changing status of a point-of-interest over time as represented by a scaling change, according to one embodiment;

FIG. 9 D is a diagram of visual representations of the changing status of a point-of-interest over time as represented by an annotation change, according to one embodiment;

FIG. 9 E is a diagram of visual representations of the changing status of a point-of-interest over time as represented by a distortion, according to one embodiment;

FIG. 10 B is a diagram of an individual visual representation of a past event for a point-of-interest, according to one embodiment;

FIG. 10 C is a diagram of individual visual representations of the changing status of a point-of-interest over time, such that past and current information are both displayed, according to one embodiment;

DESCRIPTION OF SOME EMBODIMENTS

Examples of a method, apparatus, and computer program for processing status information for one or more points of interest to determine the changes for generation of various representations for presenting in a user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to a processing of status information, especially building city permit data, associated with one or more points of interest to determine point-of-interest changes, it is contemplated that the status information may include a variety of informational sources or databases including other public information (Open311, etc.), corporate information, crowd source data, network information and other like data sources. The status information may include or be augmented with information related to location, ownership, operational state, advertisements, coupons, other like information, or a combination thereof. Also, it may include information related to factors of interest to a customer's preferences of the point-of-interest or area, such as construction, traffic, or other influences on the operational state of the point-of-interest.

In addition, although various embodiments are described with respect to an extraction of the status information from one or more building permit databases for point-of-interest changes, it is contemplated that the embodiments are also applicable to multiple types of extraction and processing of city permit data. For example, the city permit data may be extracted from an online database or from physical building permit information. Such processing of city permit data may include simple updating of current databases; more sophisticated analysis using algorithms to determine one or more circumstances resulting from public information; machine learning protocols to incorporate past public information, mapping information, and other like information; a combination thereof; or other like methods. Furthermore, the city permit data may be included to construct or update a model as a means of using a machine learning protocol.

Figure 1A:
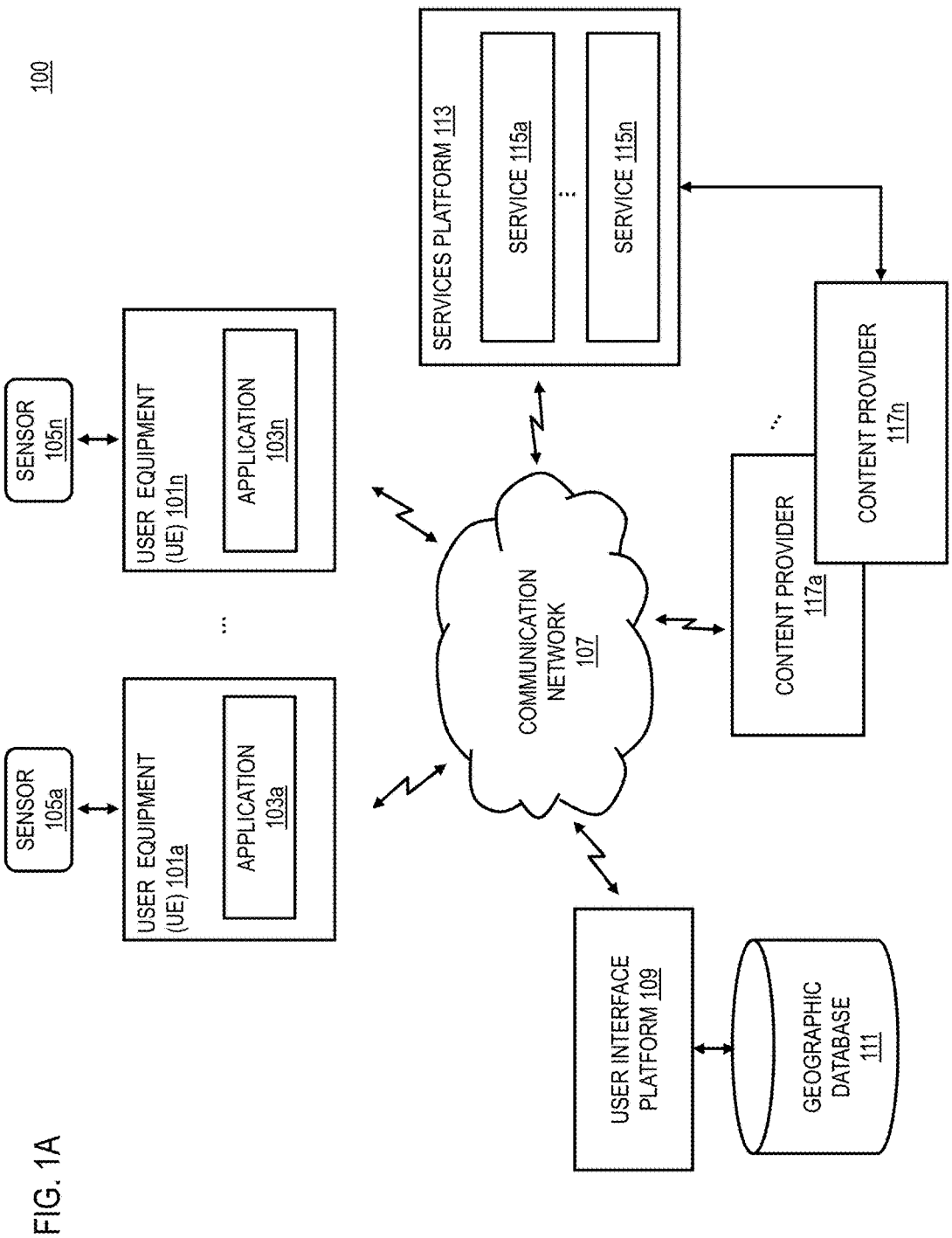
FIG. 1A is a diagram of a system capable of processing status information for one or more points of interest to determine the changes for generation of various representations for presenting in a user interface, according to one embodiment.
Figure 1B:
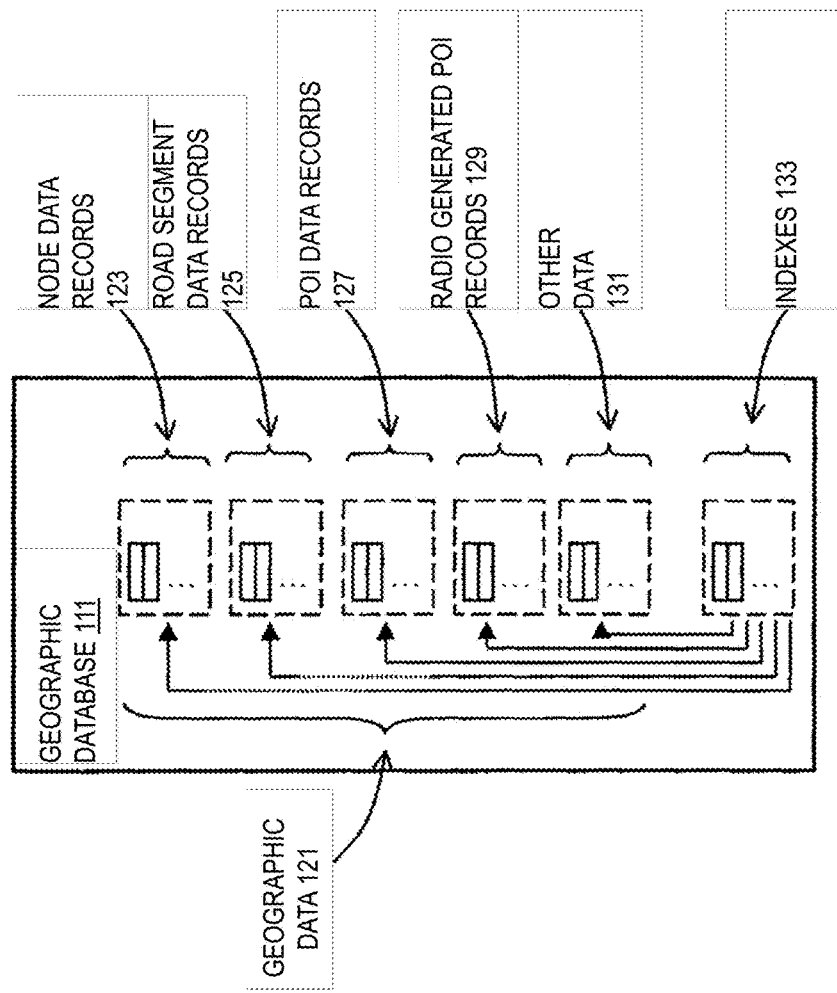
FIG. 1B is a diagram of the components of a geographic database platform 111, according to one embodiment.

FIG. 1 is a diagram of a system capable of processing status information for one or more points of interest to determine the changes for generation of various representations for presenting in a user interface, according to one embodiment. As noted above, the determination of updated point-of-interest information may be difficult due to a lack of information. This is especially problematic in cities under considerable change, such as may be the case in areas of building construction, rezoning, or business volatility. This means that navigation or mapping services may provide a considerable quantity of outdated information. One way of coping with this shortcoming is to provide mapping services compatible with a user interface that incorporate dynamic information in a user friendly way. This invention aims to uniquely extract city permit data, such as building permit data from public information and/or databases, to enable the system 100 to update the information and also to anticipate future changes for a user. Further, the system 100 may use visual representations of point-of-interest changes in a way to indicate such change, as may be the case, for ownership, corporate information, or in relation to a closing or opening status. In one embodiment, the status change information represented by the system 100 does not include changes in business hours or hours of operations (e.g., changing from opening hours from 7:00 AM to 8:00 AM), but instead cover non-hours related changes such as whether a business type has changed, a POI has relocated, a POI has ceased to operate, a POI as reopened for business under new management, a business has changed its brand, and the like. Such status may be indicated by changes of text information, color, transparency, scale, animation, and/or other like techniques as will be described in further detail.

Moreover, these map applications for user interfaces have generally lacked reliable data to enable a representation, such as an icon, to embody point-of-interest changes. In other words, the mapping applications are static until updated with new information. Furthermore, because the classifications of status are often rigid, there is little use for a machine learning protocol and/or modeling to be able to understand the changes comprehensively. In addition, city permit data has not been widely available for the public to know when a new building or business may be constructed. Thus, the user of a user-interface is unable to know for sure, which mapping information is entirely correct. Recently, however, open permit initiatives by city governments, such as Open311, allow the public to access permit information containing past, current, and future building permits and plans as well as other public information.

To address this problem, a system 100 of FIG. 1 introduces a new method of processing city permit data to determine status information for one or more points of interest and then present such status information as a visual representation via a user-interface. In one embodiment, the system 100 processes status information for one or more particular points of interest. As discussed, such information is gathered from city permit data, such as building permits, which includes particular point-of-interest information as to openings, closings, construction, change of company ownership, and other like information. As noted above, in one embodiment, the status information does not include changes in business hours or hours of operations. The system 100 can then process such permit data in conjunction with other information, such as public information, corporate information, mapping information, and other such information as may be necessary to determine a past, current, or future point-of-interest status. Such processes may be performed using techniques known in the art—data extraction or other techniques, such as statistical modeling, and/or machine learning protocols. Once this status information has been determined, the system 100 may use mapping software and other programs for a user interface to generate representations of the point-of-interest changes. Such representations may include a changing of an icon's characteristic shape, color, transparency, as well as an animation to represent the change. As previously mentioned, such change may be represented and/or monitored via a user-interface, which represents a mapping and/or characterization of point-of-interest changes.

In another embodiment, the system 100 may extract status information for one or more points of interest from one or more building permit databases. Such databases may include city permit databases (Open311) containing up-to-date information on building permits for new construction, business ownership changes, and/or indicating other relevant changes. The permit data may be captured from actual building permits and stored in a database or otherwise extracted and utilized. Such data can be organized in any way to indicate status information for the relevant points of interest for the user-interface. One way, may include using the building permit data in conjunction with mapping data and other data to construct a machine learning mechanism to determine point-of-interest changes. The machine learning may include a modeling of the status information by incorporating one or more permit datasets to comprehensively understand the changes and to make predictions accordingly.

In one embodiment, the system 100 may cause a presentation of a representation of point-of-interest changes as one or more interactive user interface elements in a user-interface and further cause a presentation of the point-of-interest change information based on both point-of-interest changes and user interactions with the user interface elements. In other words, a point-of-interest is represented in a user interface, visually or otherwise, as an interface element, such as on icon, and may represent the point-of-interest using text, logos, images, picture(s), and other like information to adequately indicate the particular location. Furthermore, this representation can be user interactive, such as by selection using a touch screen or interactive menus. Thereby, a user may select a preferred presentation of points of interest, such as icons on a map or menus including searchable locations. Furthermore, a user may select or locate a point-of-interest in the user interface based on a particular generality, such as by company name, type of service (coffee, pizza, restaurant), as is well known in the art.

In one embodiment, the system 100 may process and/or determine temporal data associated with a point-of-interest. Such data, as previously mentioned, may include city permit data, such as for building permits, as well as other information including rezoning, weather related activity, road construction, contextual information, and other like information. Thereby, the point-of-interest representation may change in a variety of ways, such as by using textual notices or changes of color, transparency, size, and the like. These visual representations may include a variety of change data, such for a closed, closing, coming soon, or newly opened business.

In one embodiment, the system 100 may cause a mapping of the point-of-interest changes as visual representations and include temporal changes of the representations to effectively indicate such change. The relevant building permit data and other relevant information may be gathered, and after a determination of the point-of-interest status information, the system 100 may map these locations for an interactive user interface. The locations are then visually indicated as a point-of-interest; public building, place of business, residential area, landmark, etc. Furthermore, the visual representations may include some change over a time period in the user interface. This may include one or more changes in visual characteristics for a particular status.

In an example use case, to solve the problem of point-of-interest (POI) changes that are visualized as one-time transitions with the POI present one day and gone the next, the system 100 construes city permit data including building permit data from public sources to be able to map locations over time and further notify a user when such a change will occur at a future time. Thus, a user, using a cell phone or navigation system (among other user interfaces), may be able to visualize a coffee shop of interest that is currently open, yet set to close the following week according to the permit data. Such a display may involve a textual notification, such as "closing soon". The user thus knows that the coffee location may be visited during the current week, but not during the next week. In this scenario, the system 100 may further indicate that the location is to be demolished, or perhaps, change from a coffee shop to a pizza place. Therefore, the user may plan accordingly. Further, in another scenario, a user in the case of transition to from a coffee shop to a pizza place, may search for a pizza place and receive a result that the pizza place will be opening the next week. This may be shown as an animation of the coffee shop icon turning into a pizza place icon with a corresponding notification of opening soon for the pizza place. Furthermore, the coffee shop icon may be shown to fade away with a corresponding date notification for the closing, while the pizza place may be shown in its place with a corresponding date notification for opening.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the user interface platform 109 via the communication network 107. In one embodiment, the user interface platform 109 perform the functions associated with a processing of probe trace data to determine one or more modes of transport.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as content provisioning services, location-based service applications, navigation applications, camera/imaging application, media player applications, social networking applications, calendar applications, and the like. In one embodiment, one of the applications 103 at the UE 101 may act as a client for the user interface platform 109 and perform one or more functions of the user interface platform 109. In one scenario, users are able select the particular mode of transport for identification via one or more map applications. In one embodiment, one or more receivers of the UE 101 may process status information associated with one or more points of interest to determine point-of-interest changes and may present point-of-interest representations in a point-of-interest user interface.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, Wi-Fi, etc.). In one scenario, the one or more sensors 105 may detect attributes for one or more modes of transportation. In another scenario, the one or more UE 101 may have sensors tuned to detect characteristic aggregates of one or more modes of transport, whereby the sensor data may be calculated either on the cloud or by the UE 101.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The services platform 113 may include any type of service. By way of example, the services platform 113 may include content (e.g., audio, video, images, etc.) provisioning services, application services, storage services, contextual information determination services, location based services, social networking services, information (e.g., weather, news, etc.) based services, etc. In one embodiment, the services platform 113 may interact with the UE 101, the 3D user interface platform 109 and the content provider 117a-117n (hereinafter content provider 117) to supplement or aid in the processing of the content information.

By way of example, services 115a-115n (hereinafter services 115) may be an online service that reflects interests and/or activities of users. In one scenario, the services 115 provide representations of each user (e.g., a profile), his/her social links, and a variety of additional information. The services 115 allow users to share media information, location information, activities information, contextual information, and interests within their individual networks, and provides for data portability.

The content provider 117 may provide content to the UE 101, the user interface platform 109, and the services 115 of the services platform 113. The content provided may be any type of content, such as image content, video content, audio content, textual content, etc. In one embodiment, the content provider 117 may provide content that may supplement content of the applications 103, the sensors 105, or a combination thereof. By way of example, the content provider 117 may provide content that may aid in causing a generation of at least one request to capture at least one content presentation. In one embodiment, the content provider 117 may also store content associated with the UE 101, the user interface platform 109, and the services 115 of the services platform 113. In another embodiment, the content provider 117 may manage access to a central repository of data, and offer a consistent, standard interface to data, such as a repository of users' navigational data content.

For example, the geographic database 111 includes node data records 143, road segment or link data records 145, POI data records 147, and other data records 151. More, fewer or different data records can be provided. In one embodiment, the other data records 151 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 145 are links or segments representing roads, streets, or paths, as can be used in the calculated route or recorded route information for processing status information for one or more points of interest to determine the changes for generation of various representations for presenting in a user interface, according to exemplary embodiments. The node data records 143 are end points corresponding to the respective links or segments of the road segment data records 145. The road link data records 145 and the node data records 143 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 147. The geographic database 111 can also include data about places, such as cities, towns, or other communities, and other geographic features, such as bodies of water, mountain ranges, etc. Such place or feature data can be part of the POI data 147 or can be associated with POIs or POI data records 147 (such as a data point used for displaying or representing a position of a city). In addition, the geographic database 111 can include and/or be associated with event data (e.g., traffic incidents, constructions, scheduled events, unscheduled events, etc.) associated with the POI data records 147 or other records of the geographic database 111.

The geographic database 111 can be maintained by the content provider 117 (e.g., a map developer) in association with the services platform 107. By way of example, the map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database 111 can be a master geographic database, but in alternate embodiments, the client side geographic database 111 can represent a compiled navigation database that can be used in or with end user devices (e.g., UEs 101) to provide navigation and/or map-related functions. For example, the geographic database 111 can be used with the end user device 101 to provide an end user with navigation features. In such a case, the geographic database 111 can be downloaded or stored on the end user device UE 101, such as in applications 103, or the end user device UE 101 can access the geographic database 111 and/or 113 through a wireless or wired connection (such as via a server and/or the communication network 119), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation and map functions such as guidance and map display, for example, and for determination of one or more personalized routes or route segments based on one or more calculated and recorded routes, according to exemplary embodiments.

Figure 2:
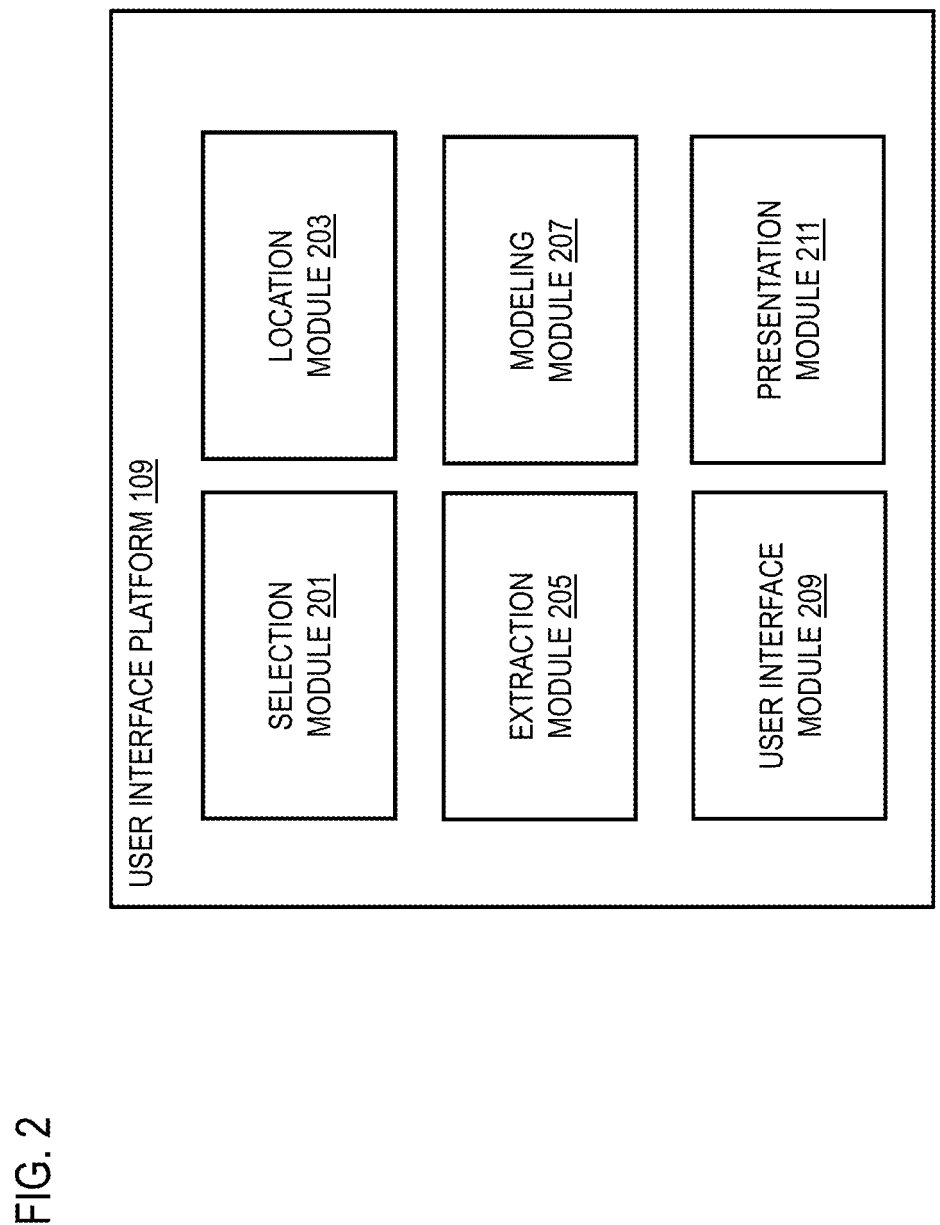
FIG. 2 is a diagram of the components of a user interface platform 109, according to one embodiment.

FIG. 2 is a diagram of the components of a user interface platform 109, according to one embodiment. By way of example, the user interface platform 109 includes one or more components for processing status information for one or more points of interest to determine the changes for generation of various representations for presenting in a user interface. It is contemplated that the functions of these components may be combined in one or more components or performed by other components of equivalent functionality. In one embodiment, the user interface platform 109 includes a selection module 201, a location module 203, an extraction module 205, a modeling module 207, a user-interface module 209, and a presentation module 211.

In one embodiment, the selection module 201 may request content from, for example, the content providers 117. As such, the selection module 201 may identify building and other related city information. Furthermore, the selection module 201 may include user applications 103 to select and/or request information on particular points of interest. In one embodiment, the selection module 201 may be configured to select a particular building using a touch screen or selection menu. In one embodiment, the selected location or location type may include one or more attributes including opening/closing data (e.g., new business opening such as newly created businesses or current business closing such as current businesses ceasing operations that are not related to just business hours or hours of operations), corporate data, building-type information, licensing (liquor, etc.), and other like attributes. In one embodiment, the selection may a selected future time period and as such a fading out or elimination of building structures or building information for buildings not in the time period.

In one embodiment, the location module 203 includes an integrated system for a processing of city permit data and mapping data including location information to determine location information for one or more points of interest. Such location information can be stored in an on-board systems database, modified manually, accessed when prompted by an application 103, or gathered from devices or sensors incorporated into the selection module 201 and processed via the location module 203 to provide point-of-interest and mapping location information. The location module 203 may also be used to correlate mapping information with point-of-interest data. This location information may be further modified with user preferences and tolerances, which, in part, provide selective modifications of the location determination system.

In multiple embodiments, the extraction module 205 will process the outputted information of the selection module 201 and location module 203, respectively. The selection module 201 and location module 203 configure the mapping information and the point-of-interest data. Therefore, the user interface platform 109 includes an extraction module 205 to evaluate the selection module 201 and location module 203 and integrate the two using city permit data as well as other inputted data, algorithms, and process formats to calculate relevant point-of-interest information and determine discrepancies and errors for the mapping of point-of-interest information. This integrated mapping and point-of-interest data may be outputted to the modeling module 207 to provide the appropriate analysis of statistical patterns for permit data or point-of-interest data that require more extensive statistical analysis for creating representations of change over time.

In multiple embodiments, the modeling module 207 causes an analysis of the permit data, point-of-interest data, and location information based, in part, on the extraction module 205, which extracts permit data as well as evaluates the selection module 201, location module 203, and extraction module 205, respectively. This module 207 may make a determination of one or more point-of-interest changes over time based on a statistical analysis of the permit data in conjunction with other point-of-interest and location information. Numerous inputs may be applicable including particular points of interest, location types (coffee, restaurant, etc.), other personal preferences, software requirements, network data, sensor inputs, real-time data and other like inputs. Furthermore, the modeling module 207 can incorporate feedback information from other modules through multiple iterations. The processed information may be included to construct or update a model as a means of using a machine learning protocol. The point-of-interest change information can be mapped to present the relevant point-of-interest change information of particular travel areas. Such information may be presented and interfaced to the at least one occupant via the presentation module 211.

In one embodiment, the user interface module 209 may be configured for exchanging information between UE 101 and the content providers 117. In another embodiment, the user interface module 209 enables presentation of a graphical user interface (GUI) for displaying point-of-interest representations and map images with content information in connection to one or more selected points of interest. For example, the user interface module 209 executes a GUI application configured to provide users with a processing of status information (permit data) associated with one or more points of interest to determine point-of-interest changes and a presentation of (visual) representations. The user interface module 209 employs various application programming interfaces (APIs) or other function calls corresponding to the applications 103 of UE 101, thus enabling the display of graphics primitives such as menus, buttons, data entry fields, etc., for generating the user interface elements. Still further, the user interface module 209 may be configured to operate in connection with augmented reality (AR) processing techniques, wherein various different applications, graphic elements and features may interact. For example, the user interface module 209 may coordinate the presentation of augmented reality map images in conjunction with content information for a given location or in response to a selected point-of-interest representation. In a further embodiment, the user interface module 209 may cause a presentation of point-of-interest information as representations, as photographic images, or a combination thereof.

In one embodiment, the presentation module 211 may process the city permit databases, other databases, and/or real-time contents to determine point-of-interest changes and a presentation of representations in a point-of-interest user interface. For instance, the presentation module 211 may determine sizes or dimensions to display representations of point-of-interest changes. In one scenario, the presentation module 211 may employ transition effects, such as a color change, a transparency change, a scale change, textual notices, additional icons, a distortion, an animation, or a combination thereof via the user interface. In another embodiment, the presentation module 211 may cause a presentation of content information in the most suitable manner for a consistent user experience.

Figure 3:
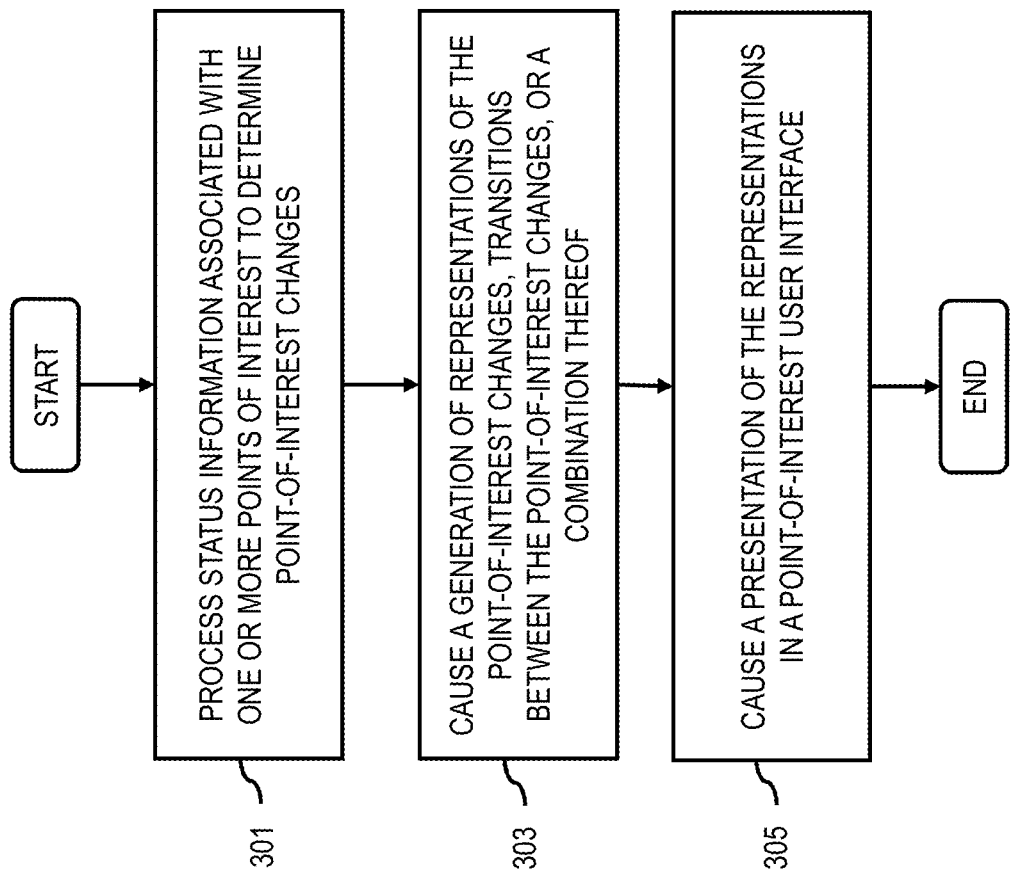
FIG. 3 is a flowchart of processing status information for one or more points of interest to determine the changes for generation of various representations for presenting in a user interface, according to one embodiment.
Figure 12:
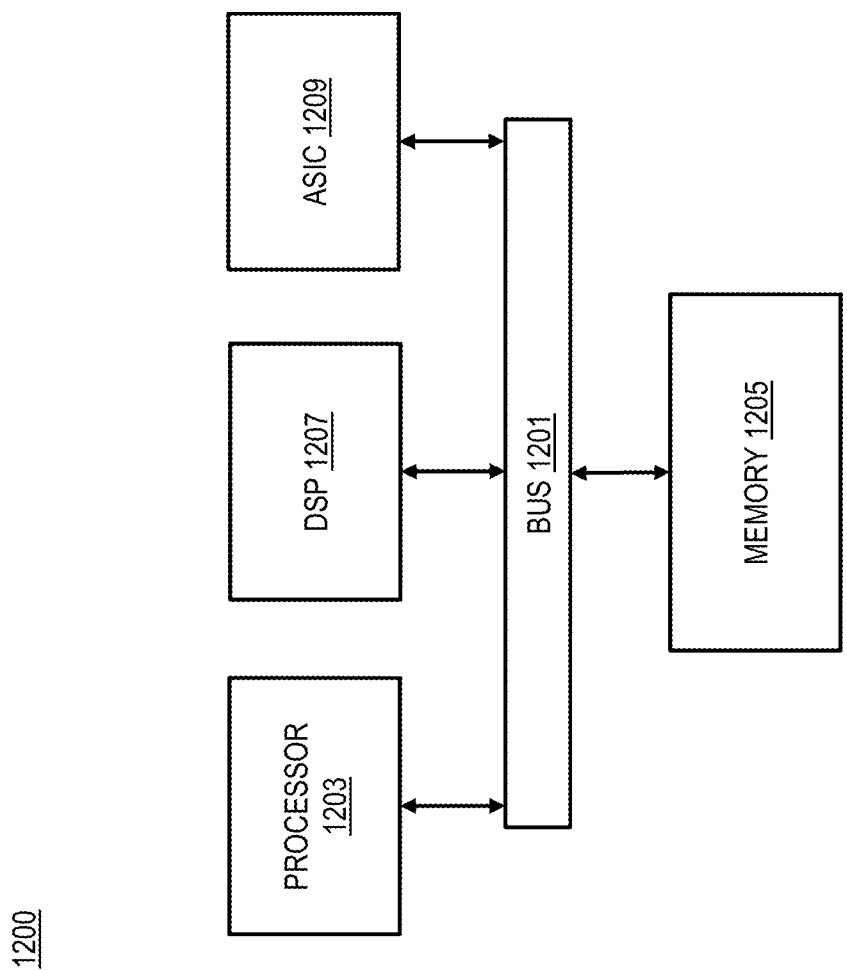
FIG. 12 is a diagram of a chip set that can be used to implement an embodiment of the invention.

FIG. 3 is a flowchart of a process for processing status information for one or more points of interest to determine the changes for generation of various representations for presenting in a user interface, according to one embodiment. In one embodiment, the user interface platform 109 performs the process 300 and is implemented in, for instance, a chip set including a processor and a memory as shown in FIG. 12.

In step 301, the user interface platform 109 processes status information for one or more particular points of interest to determine point-of-interest changes. As discussed, such status information may be gathered from city permit data, such as building permits, which may include information as to openings, closings, construction, change of company ownership, and other like information. In one embodiment, such information does not relate to changes associated with business hours or hours of operations of the points of interest. In one embodiment, the user interface platform may augment the permit data with data from other databases, such as public information, corporate information, mapping information, and other such information as may be relevant for a past, current, or future point-of-interest status. Such processes may be performed using techniques known in the art—data extraction or other techniques, such as statistical modeling, and/or machine learning protocols.

In step 303, the user interface platform 109 may cause a generation of representations or images using mapping software or other programs integrated with a user interface to generate point-of-interest changes. Such representations may include a changing of an icon's characteristic shape, color, transparency, as well as an animation to represent the change. As previously mentioned, such change may be represented and/or monitored via a user-interface, which represents a mapping and/or characterization of point-of-interest changes.

In step 305, the user interface platform 109 may cause a presentation of the one or more representations in at least one point-of-interest user interface. In multiple embodiments, the representations may be presented as icons, images, or both of varied sizes or dimensions to display the point-of-interest changes. In one scenario, transition effects may be employed, such as changes in color, size, etc. viewed via the user interface. In multiple embodiments, the visual content is subject to user constraints and preferences to view content deemed most suitable, such as particular location or particular categories of points of interest (coffee, restaurants, etc.).

Figure 4:
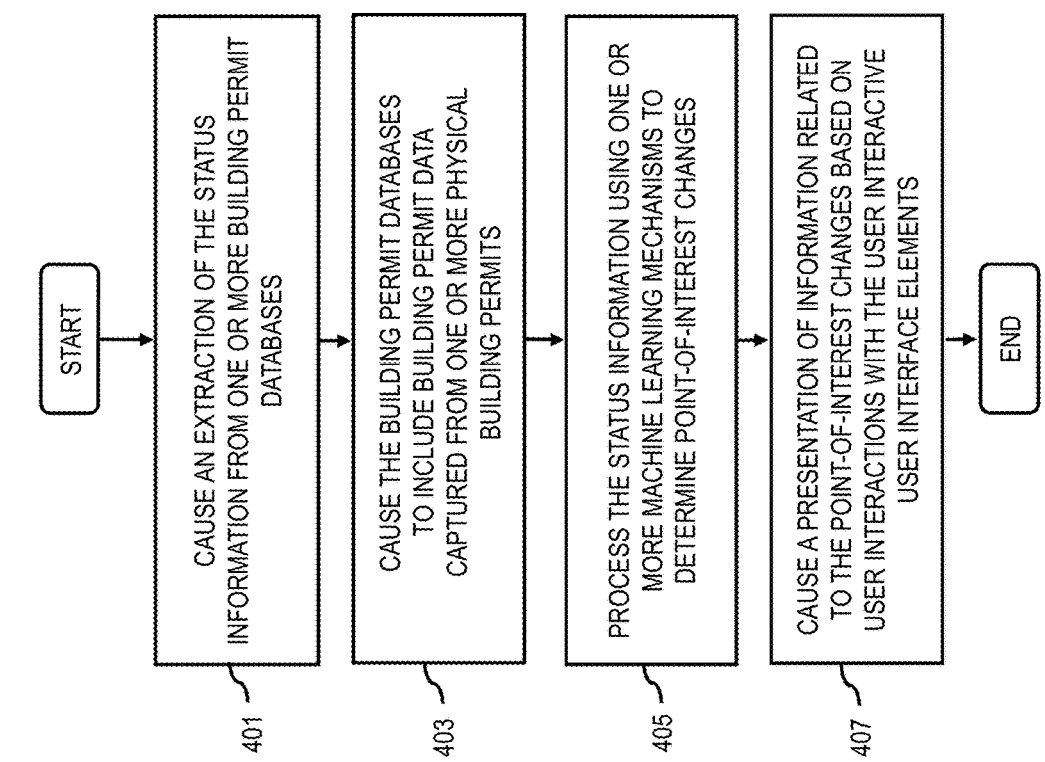
FIG. 4 is a flowchart of a process for causing an extraction of status information from building permit databases to cause a presentation of information related to the point-of-interest changes based on user interactions with a user interactive user interface, according to one embodiment.

FIG. 4 is a flowchart of a process for causing an extraction of status information from building permit databases to cause a presentation of information related to the point-of-interest changes based on user interactions with a user interactive user interface, according to one embodiment. In one embodiment, the user interface platform 109 performs the process 400 and is implemented in, for instance, a chip set including a processor and a memory as shown in FIG. 12.

In step 401, the user interface platform 109 may cause an extraction of status information for one or more points of interest from one or more building permit databases. In one embodiment, such databases may primarily include city permit databases containing up-to-date information on building permits for new construction, business ownership changes, and/or indicating other relevant changes.

In step 403, the user interface platform 109 may capture city permit data by extracting actual building permits. In one embodiment, this building permit data may be extracted from public sources, such as Open311, which includes up-to-date information on city permits and other public information. In one embodiment, this information may be used and/or combined with other public databases, network information, and/or crowd source, then either stored in a database or otherwise extracted and utilized. Such data can be organized in any way to indicate status information for the relevant points of interest for the user-interface.

In step 405, the user interface platform 109 may process the status information using one or more machine learning mechanisms to determine point-of-interest changes. In one embodiment, this may include using the building permit data in conjunction with mapping data and other datasets to construct an iterative machine learning mechanism to determine point-of-interest changes. Such machine learning protocols may also include statistical analysis and/or modeling of conditions and changes occurring in one or more locations. In one scenario, the machine learning may model the status information by incorporating one or more permit data sets in conjunction with other information including mapping data or other database information. Thus, the user interface platform 109 may include a machine learning protocol to comprehensively understand the point-of-interest changes for a particular landmark or geographic area and to make predictions accordingly.

In step 407, the user interface platform 109 may cause a presentation of a representation of point-of-interest changes as one or more interactive user interface elements in a user-interface and further cause a presentation of the point-of-interest change information based on both point-of-interest changes and user interactions with the user interface elements. In one embodiment, in other words, a point-of-interest is represented in a user interface, visually or otherwise, as an interface element, such as on icon, and may represent the point-of-interest using text, logos, images, picture(s), and other like information to adequately indicate the particular location. In one scenario, this representation can be user interactive, such as by selection using a touch screen or interactive menu(s). Thereby, a user may select a preferred presentation of points of interest, such as icons on a map or menus including searchable locations. Furthermore, a user may select or locate a point-of-interest in the user interface based on a particular generality, such as by company name, type of service (coffee, pizza, restaurant) as is well known in the art.

Figure 5:
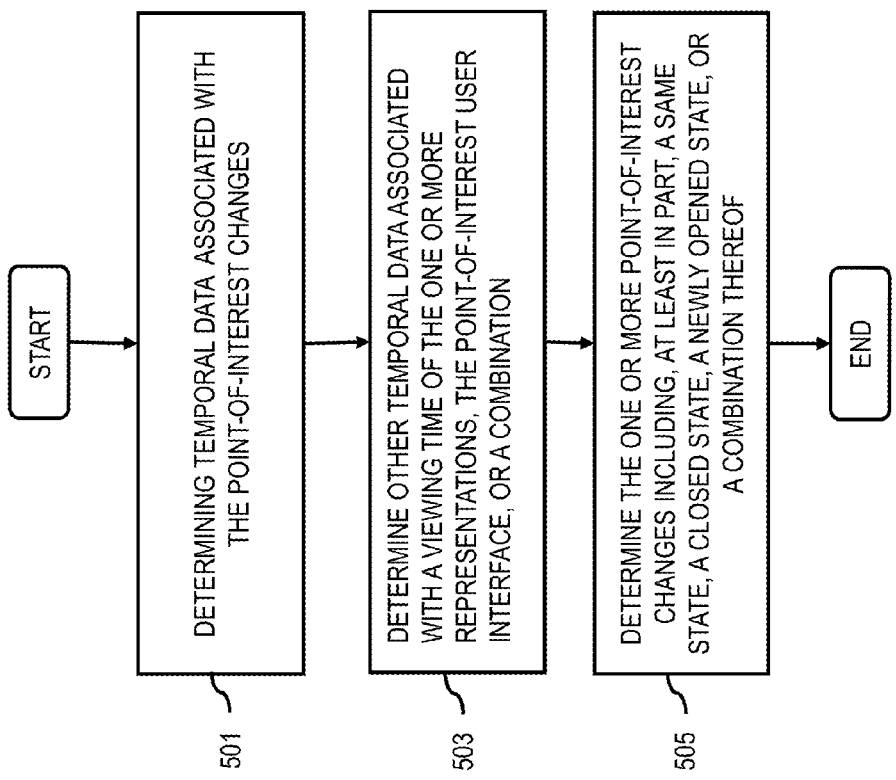
FIG. 5 is a flowchart of a process for determining temporal data associated with the one or more point-of-interest changes then generating and/or presenting one or more representations of the temporal data, according to one embodiment.

FIG. 5 is a flowchart of a process for determining temporal data associated with the one or more point-of-interest changes then generating and/or presenting one or more representations of the temporal data, according to one embodiment. In one embodiment, the user interface platform 109 performs the process 500 and is implemented in, for instance, a chip set including a processor and a memory as shown in FIG. 12.

In step 501, the user interface platform 109 may determine temporal data associated with the point-of-interest changes, wherein the generation of the representations, the presentation of the one or more representations, or a combination thereof is based, at least in part, on the temporal data. In one embodiment, the user interface platform 109 may process and/or determine temporal data associated with a point-of-interest. In one embodiment, such data, as previously mentioned, may primarily include city permit data, especially building permit data. In one scenario, the permit data may include building permit information as to openings, closings, construction/demolition, change of company ownership, and other like information.

In step 503, the user interface platform 109 may determining other temporal data associated with a viewing time of the one or more representations, the point-of-interest user interface, or a combination thereof, wherein the generation of the representations, the presentation of the representations, or a combination thereof is based, at least in part, on the other temporal data. In one embodiment, the user interface platform 109 may also include other information of a temporal nature including rezoning schedules, construction/demolition schedules, real-time data, weather related activity, road construction, contextual information, and other like information.

In step 505, the user interface platform 109 may determine the point-of-interest change of the one or more representations in the point-of-interest user interface. The user interface platform may implement the determined changes using one or more visual representations as including, at least in part, a same state, a closed state, a newly opened state, or a combination thereof. In multiple embodiments, the user interface platform 109 may process these representations as undergoing changes over time (coming soon changes to newly opened, etc.). In one embodiment, the representations may change in one or more of a variety of ways, such as by introducing changes in textual notices, color, transparency, size, and the like. These visual representations may include a number of categories for the change data including such designations as closed, closing, coming soon, or newly opened for a particular point-of-interest.

Figure 6:
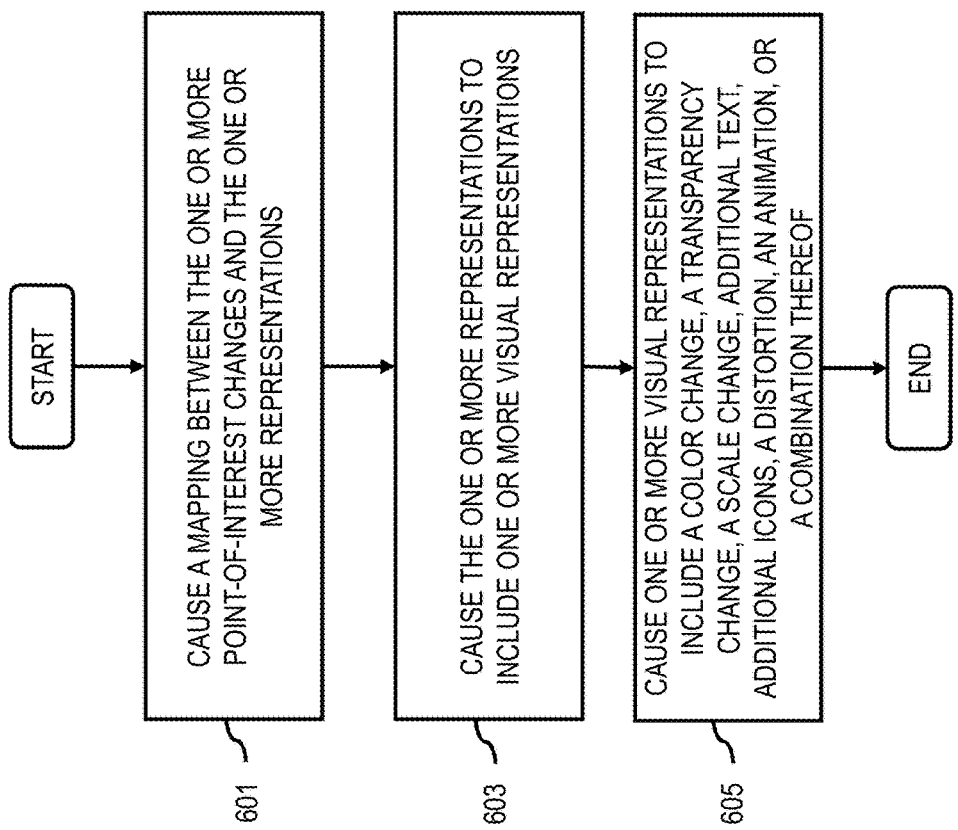
FIG. 6 is a flowchart of a process for causing, at least in part, a mapping between the one or more point-of-interest changes and the one or more representations to include a visual change, such as a color change, a transparency change, a scale change, additional text, additional icons, a distortion, an animation, or a combination thereof, according to one embodiment.

FIG. 6 is a flowchart of a process for causing, at least in part, a mapping between the one or more point-of-interest changes and the one or more representations to include a visual change, such as a color change, a transparency change, a scale change, additional text, additional icons, a distortion, an animation, or a combination thereof, according to one embodiment. In one embodiment, the user interface platform 109 performs the process 600 and is implemented in, for instance, a chip set including a processor and a memory as shown in FIG. 12.

In step 601, the user interface platform 109 may cause, at least in part, a mapping between the one or more point-of-interest changes and the one or more representations. In one embodiment, the relevant building permit data and other relevant information may be gathered, then after a determination of the point-of-interest status information, the user interface platform 109 may map the representation for an interactive user interface. In multiple embodiments, the point-of-interest changes may be applied to any setting where the information can be visually represented to improve the user experience for a presentation of ongoing change.

In step 603, the user interface platform 109 may cause the one or more representations to include, at least in part, visual representations. In one embodiment, the mapping of points of interest may include an analysis or modeling of mapping information combined with public information including city permit data. In one scenario, such information may be represented visually using one or more user interfaces. Thus, the user interface platform 109 may cause a mapping of the point-of-interest changes as visual representations and include temporal changes of the representations to effectively indicate such change.

In step 605, the user interface platform 109 may cause the one or more visual representations to include a color change, a transparency change, a scale change, additional text, additional icons, a distortion, an animation, or a combination thereof. In one embodiment, the locations are visually indicated as a point-of-interest; public building, place of business, residential area, landmark, etc. The visual representations of these locations may include some change over a time period in the user interface. As previously stated, the representation may change in a variety of ways including color, transparency, scale, etc.

FIGS. 7 A-B are diagrams of examples of city permit data that may be extracted to indicate change in a point-of-interest user interface. FIG. 7A includes public city building permit data for ABC location. Each permit has a date, description of work and location of work. This includes construction permit data. Likewise, FIG. 7B includes shows public city building permit data for Chicago. Each permit has a date, description of work and location of work. This includes demolition permit data. Both datasets of FIGS. 7 A-B may be catalogued and extracted for processing the said status information, according to multiple embodiments.

Figure 8:
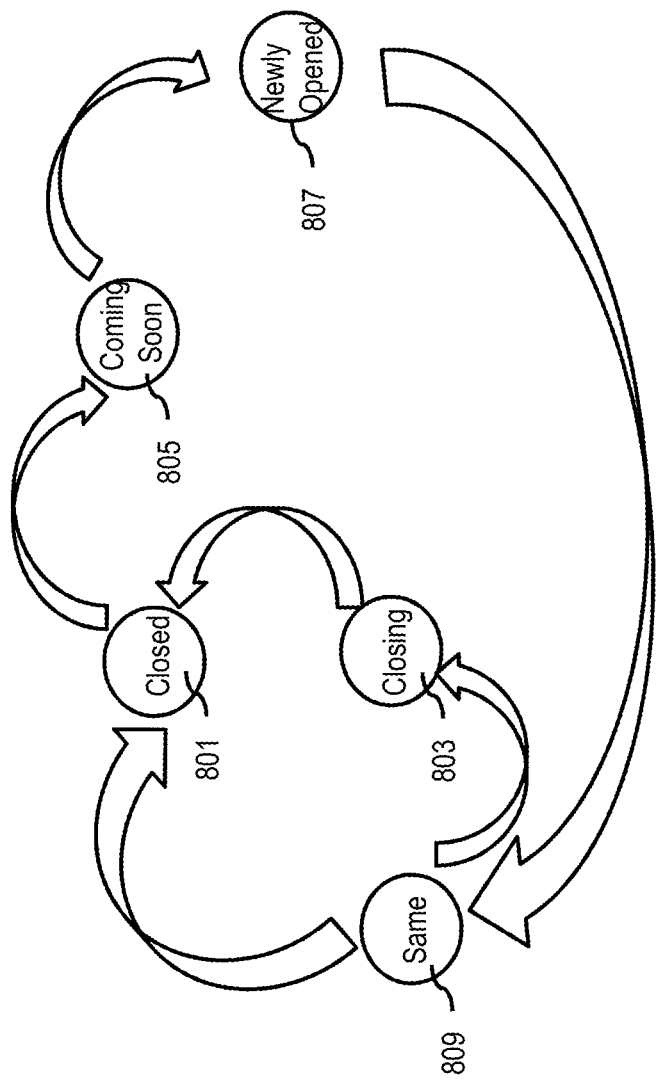
FIG. 8 is a general diagram of the changing status of a point-of-interest over time, which may include visual representations as required, according to one embodiment.
Figure 9A:
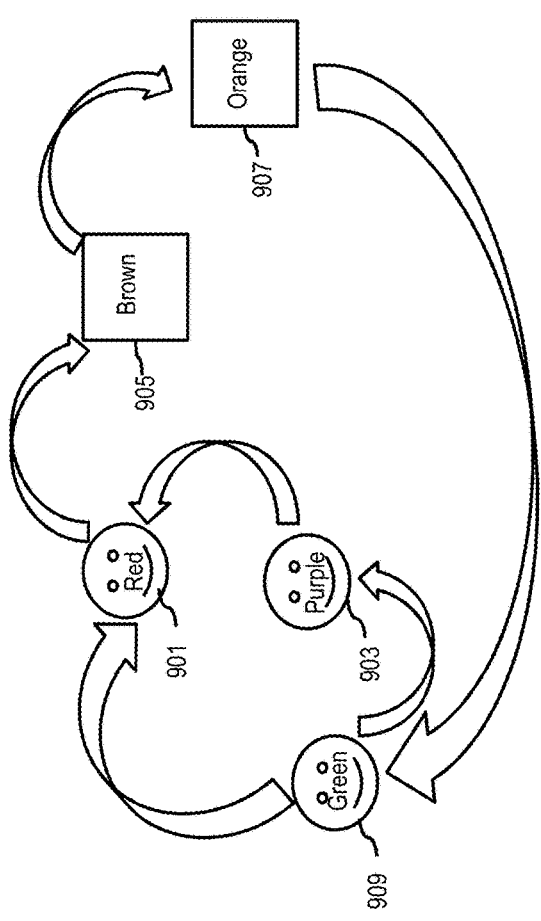
FIG. 9 A is a diagram of visual representations of the changing status of a point-of-interest over time as represented by a color change, according to one embodiment.
Figure 9B:
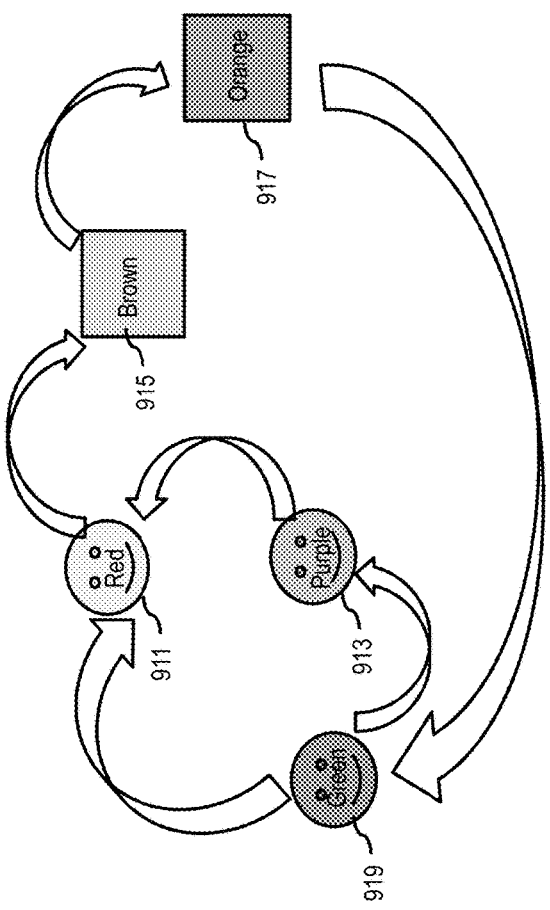
Figure 9C:
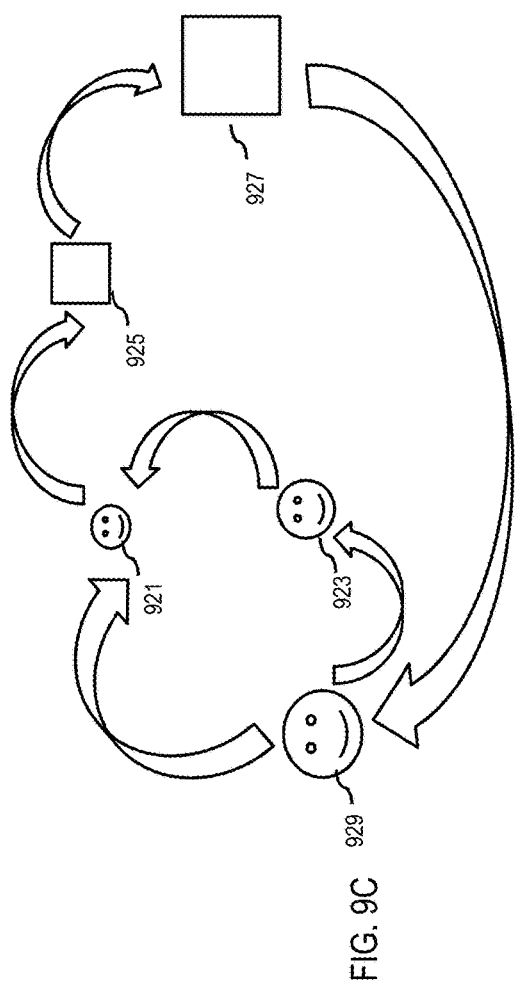
Figure 9D:
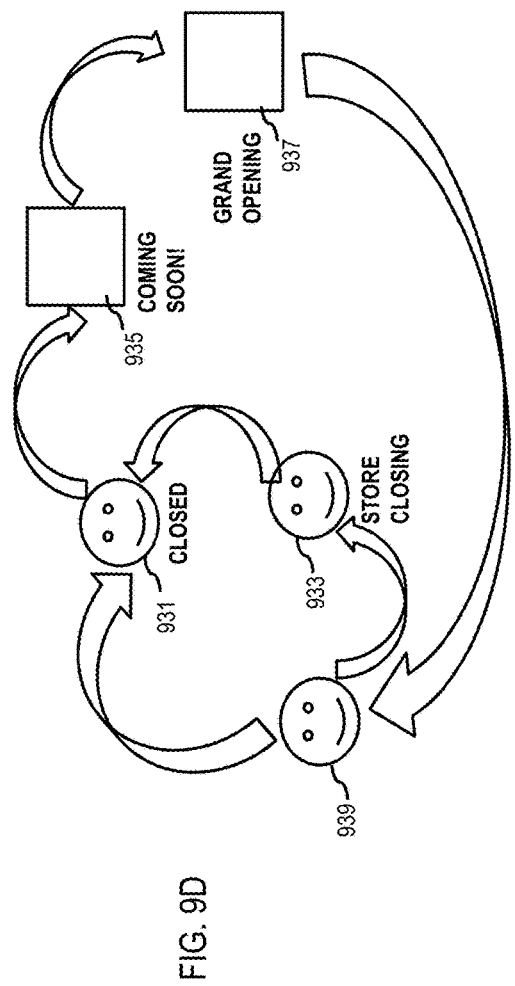
Figure 9E:
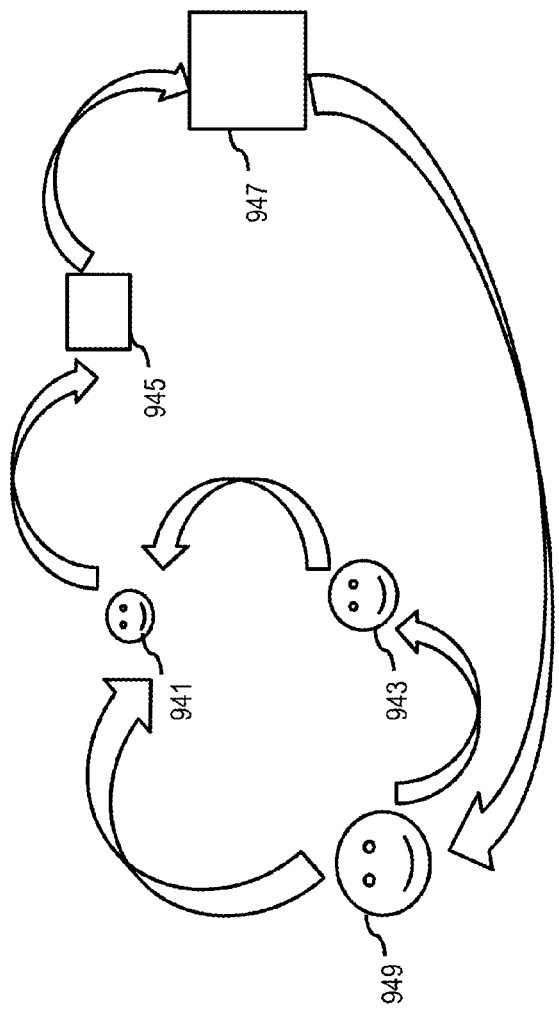

FIG. 8 is a diagram of changing status of a point-of-interest over time. The status of a point-of-interest includes the transition diagram between them. Also, the designations of closed 801, closing 803, coming soon 805, newly opened 807 and same 809 may refer to the status of the point-of-interest. Thereby, the point-of-interest representation may change in a variety of ways when applied to specific circumstances, such as by using textual notices or changes of color, transparency, size, and the like. Thus, these visual representations may include a variety of change data information in addition to the general designations (closed, closing, coming soon, etc.) and may be shown in a map display.

FIG. 9 A is a diagram of visual representations of the changing status of a point-of-interest over time as represented by a color change. For purposes of demonstration, the smile represents a coffee shop (Smile Coffee Shop) and the squares indicate a sandwich shop (Square Sandwich Shop). In one scenario, these diagrams show how one business could transform into another, for example, a coffee shop transitioning into a sandwich shop or vice versa. The visual representations may change in one or more ways to indicate such designations as Closed, Closing, Coming Soon, Newly Opened, etc., which refer to the status of the point-of-interest. The representations may indicate change such as that shown using a change in color. The designations shown may be followed (Same (Green) 909 to Closing (Purple) 903 to Closed (Red) 901 to Coming Soon (Brown) 905 to Newly Opened (Orange) 907), steps could be skipped (Same (Green) 909 to Newly Opened (Orange) 907), or other like systems may be employed. These changes may correspond with the type of designations of FIG. 8 or other selectable point-of-interest change information and may be shown in a map display.

FIG. 9 B is a diagram of visual representations of the changing status of a point-of-interest over time as represented by a transparency change. For purposes of demonstration, the smile represents a coffee shop (Smile Coffee Shop) and the squares indicate a sandwich shop (Square Sandwich Shop). In one scenario, these diagrams show how one business could transform into another, for example, a coffee shop transitioning into a sandwich shop or vice versa. The visual representations may change in one or more ways to indicate such designations as Closed, Closing, Coming Soon, Newly Opened, etc., which refer to the status of the point-of-interest. The representations may indicate change such as that shown using a change in transparency. The designations shown may be followed (Same (fully non-transparent) 919 to Closing (30% transparent) 913 to Closed (fully transparent) 911 to Coming Soon (70% transparent) 915 to Newly Opened (fully non-transparent) 917), steps could be skipped (Same (fully non-transparent) 919 to Newly Opened (fully non-transparent) 917)), or other like systems may be employed. These changes may correspond with the type of designations of FIG. 8 or other selectable point-of-interest change information and may be shown in a map display.

FIG. 9 C is a diagram of visual representations of the changing status of a point-of-interest over time as represented by a scaling change. For purposes of demonstration, the smile represents a coffee shop (Smile Coffee Shop) and the squares indicate a sandwich shop (Square Sandwich Shop). In one scenario, these diagrams show how one business could transform into another, for example, a coffee shop transitioning into a sandwich shop or vice versa. The visual representations may change in one or more ways to indicate such designations as Closed, Closing, Coming Soon, Newly Opened, etc., which refer to the status of the point-of-interest. The representations may indicate change such as that shown using a change in scale. The designations shown may be followed (Same (full size) 929 to Closing (70% size) 923 to Closed 921 (10% or less size) to Coming Soon (30% size) 925 to Newly Opened (full size) 927), steps could be skipped (Same (full size) 929 to Newly Opened (full size) 927), or other like systems may be employed. These changes may correspond with the type of designations of FIG. 8 or other selectable point-of-interest change information and may be shown in a map display.

FIG. 9 D is a diagram of visual representations of the changing status of a point-of-interest over time as represented by an annotation change. For purposes of demonstration, the smile represents a coffee shop (Smile Coffee Shop) and the squares indicate a sandwich shop (Square Sandwich Shop). In one scenario, these diagrams show how one business could transform into another, for example, a coffee shop transitioning into a sandwich shop or vice versa. The visual representations may change in one or more ways to indicate such designations as Closed, Closing, Coming Soon, Newly Opened, etc., which refer to the status of the point-of-interest. The representations may indicate change such as that shown using a change in annotation. The designations shown may be followed (Same 939 to Closing 933 to Closed 931 to Coming Soon 935 Newly Opened 937), steps could be skipped (Same 939 to Newly Opened 937), or other like systems may be employed. These changes may correspond with the type of designations of FIG. 8 or other selectable point-of-interest change information and may be shown in a map display.

FIG. 9 E is a diagram of visual representations of the changing status of a point-of-interest over time as represented by a distortion. For purposes of demonstration, the smile represents a coffee shop (Smile Coffee Shop) and the squares indicate a sandwich shop (Square Sandwich Shop). In one scenario, these diagrams show how one business could transform into another, for example, a coffee shop transitioning into a sandwich shop or vice versa. The visual representations may change in one or more ways to indicate such designations as Closed, Closing, Coming Soon, Newly Opened, etc., which refer to the status of the point-of-interest. The representations may indicate change such as that shown using a distortion. In one embodiment, the distortion may be a change in proportion, a smeared appearance, a fuzzy appearance, a combination thereof, or other like distortion. The designations shown may be followed (Same (undistorted) 949 to Closing (30% distorted) 943 to Closed (90% or more distorted) 941 to Coming Soon (30% distorted) 945 to Newly Opened (undistorted) 947), steps could be skipped (Same (undistorted) 949 to Newly Opened (undistorted) 947), or other like systems may be employed. These changes may correspond with the type of designations of FIG. 8 or other selectable point-of-interest change information and may be shown in a map display.

Figure 10A:
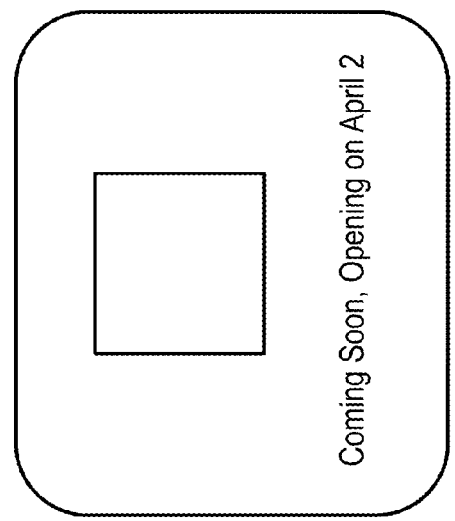
FIG. 10 A is a diagram of an individual visual representation of a future status for a point-of-interest, according to one embodiment.
Figure 10B:
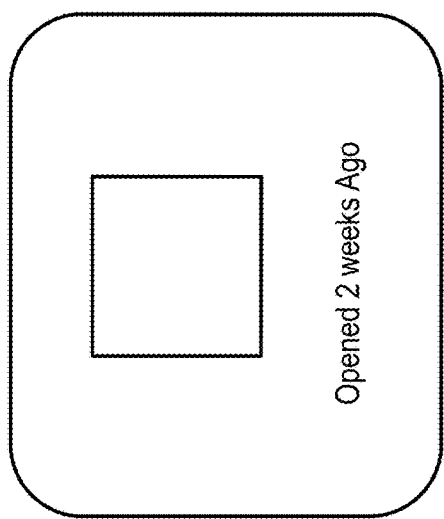
Figure 10C:
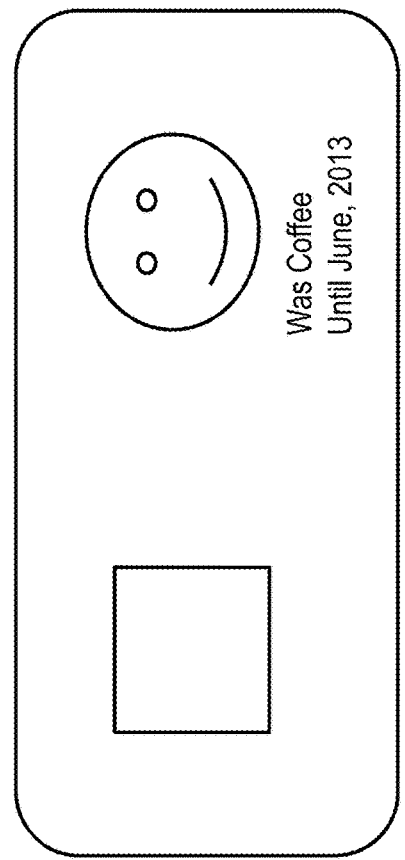

FIG. 10 A is a diagram of an individual visual representation of a future status for a point-of-interest. For purposes of demonstration, the smile represents a coffee shop (Smile Coffee Shop) and the squares indicate a sandwich shop (Square Sandwich Shop). The visual representation may indicate particular information regarding the point-of-interest future status. Such information may include a business opening. This information may be integrated with the transformations shown in FIGS. 9 A-E. The representations may indicate change such as that shown using one or more logos or image information and may be shown in a map display.

FIG. 10 B is a diagram of an individual visual representation of a past event for a point-of-interest. For purposes of demonstration, the smile represents a coffee shop (Smile Coffee Shop) and the squares indicate a sandwich shop (Square Sandwich Shop). The visual representations may indicate particular information regarding the point-of-interest status, such as detailed information regarding the business opening. Such information may include a length of operation. This information may be integrated with the transformations shown in FIGS. 9 A-E. The representations may indicate change such as that shown using one or more logos or image information and may be shown in a map display.

FIG. 10 C is a diagram of individual visual representations of the changing status of a point-of-interest over time, such that past and current information are both displayed. For purposes of demonstration, the smile represents a coffee shop (Smile Coffee Shop) and the squares indicate a sandwich shop (Square Sandwich Shop). The visual representations may indicate particular information regarding the point-of-interest status, such as a comparison of past and current point-of-interest information. Such information may include a prior ownership, a current ownership, and/or a business transfer date. This information may be integrated with the transformations shown in FIGS. 9 A-E. The representations may indicate change such as that shown using one or more logos or image information and may be shown in a map display.

The processes described herein for processing status information for one or more points of interest to determine the changes for generation of various representations for presenting in a user interface may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
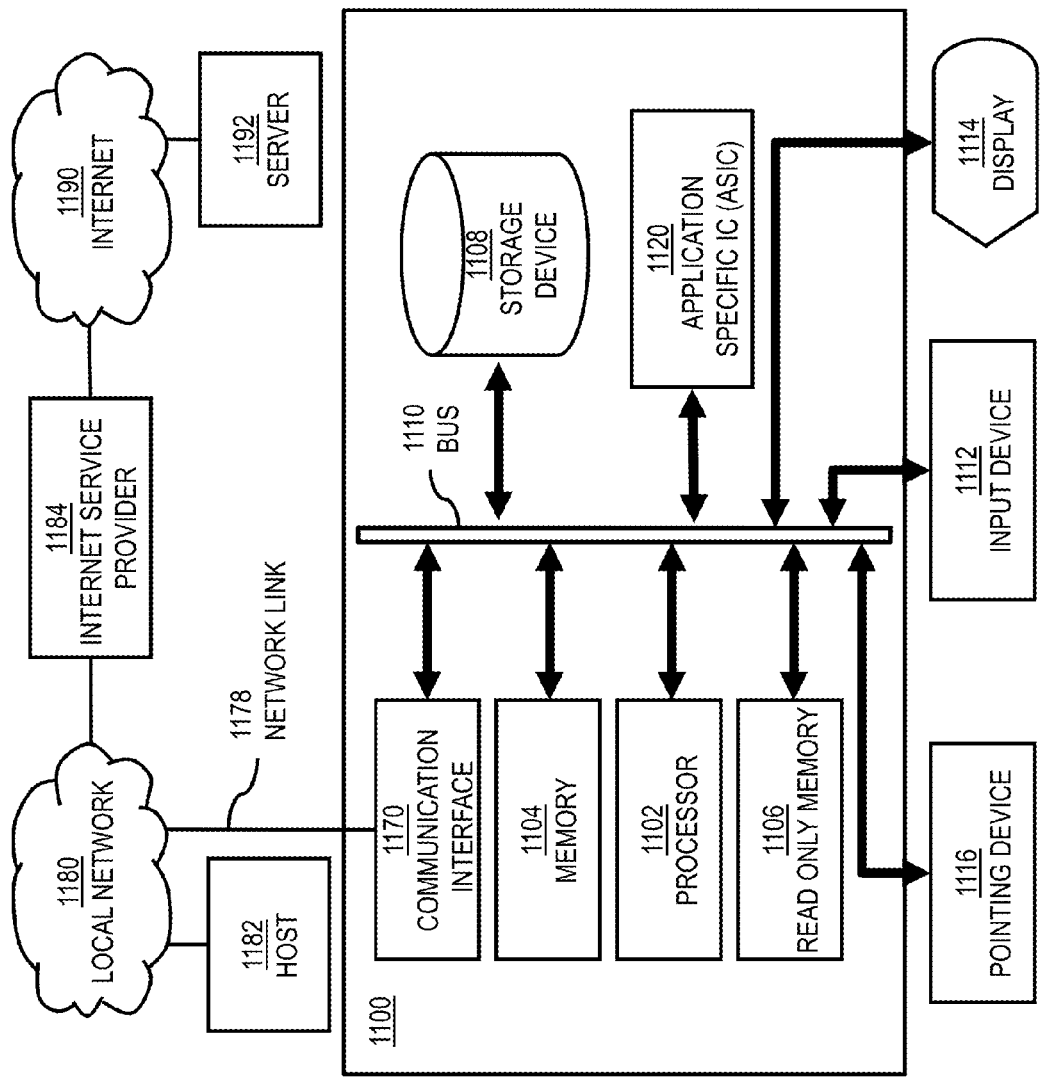
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to process status information for one or more points of interest to determine the changes for generation of various representations for presenting in a user interface as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of processing status information for one or more points of interest to determine the changes for generation of various representations for presenting in a user interface.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to processing status information for one or more points of interest to determine the changes for generation of various representations for presenting in a user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for processing status information for one or more points of interest to determine the changes for generation of various representations for presenting in a user interface. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for processing status information for one or more points of interest to determine the changes for generation of various representations for presenting in a user interface, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for processing status information for one or more points of interest to determine the changes for generation of various representations for presenting in a user interface to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to process status information for one or more points of interest to determine the changes for generation of various representations for presenting in a user interface as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of processing status information for one or more points of interest to determine the changes for generation of various representations for presenting in a user interface.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to process status information for one or more points of interest to determine the changes for generation of various representations for presenting in a user interface. The memory 1205 also stores the data associated with or generated by the execution of the inventive steps.

Figure 13:
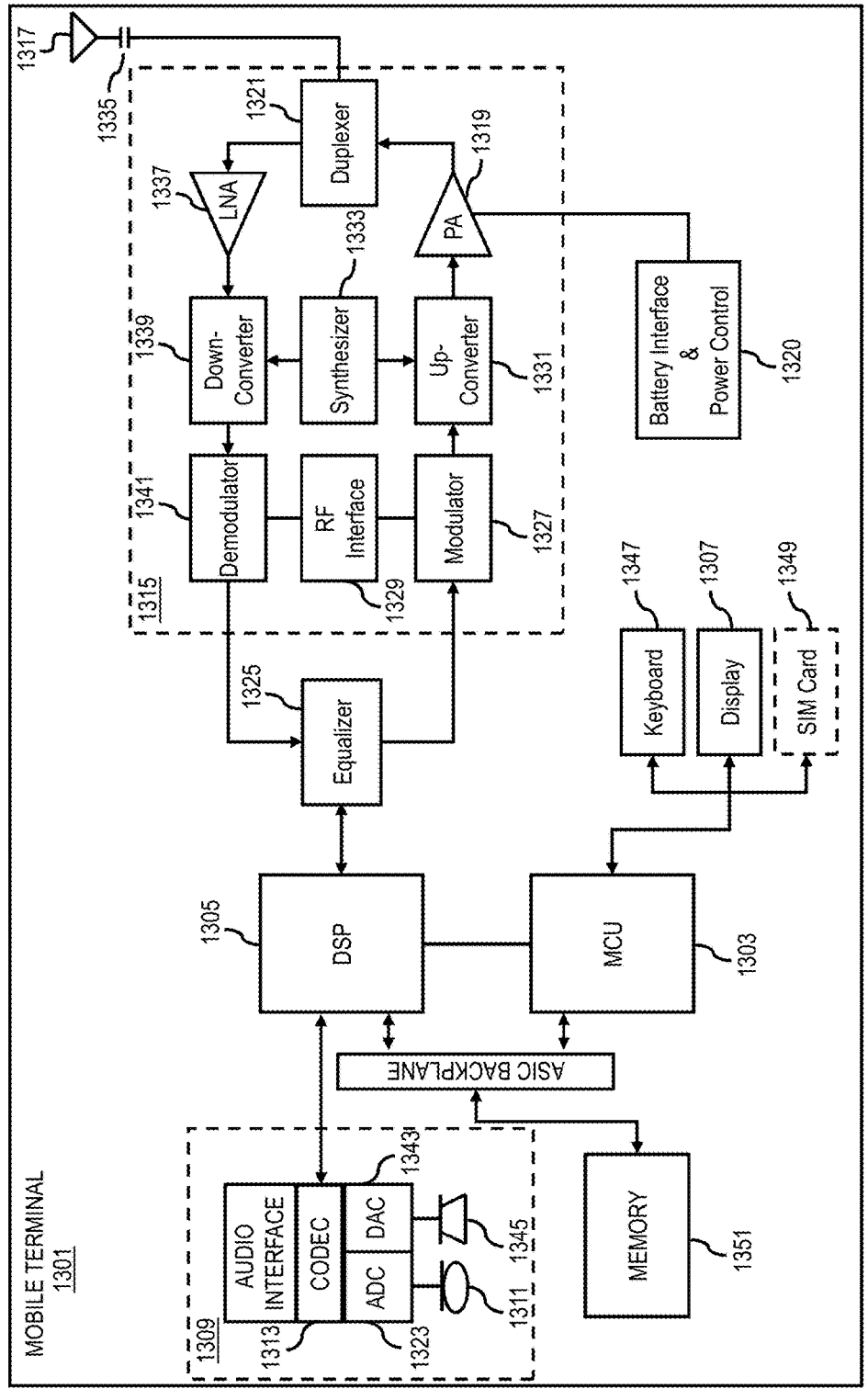
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of processing status information for one or more points of interest to determine the changes for generation of various representations for presenting in a user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of processing status information for one or more points of interest to determine the changes for generation of various representations for presenting in a user interface. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to process status information for one or more points of interest to determine the changes for generation of various representations for presenting in a user interface. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for presenting one or more visual representations for conveying information about at least one point-of-interest change, the method comprising:
    receiving status information associated with one or more points of interest from one or more public permit databases, wherein the status information indicates at least one of an ownership change, a corporate information change, a closing or opening status change other than a change in business hours and/or hours of operation, or a combination thereof;
    determining, by at least one processor based at least in part on the status information, one or more point-of-interest changes, one or more transitions between the one or more point-of-interest changes, or a combination thereof,
        wherein the one or more point-of-interest changes and/or transitions include, at least in part, one or more location changes, one or more type changes, one or more operational state changes, or a combination thereof associated with at least one of the one or more points of interest;
    causing, at least in part, a generation of one or more representation objects associated with the one or more point-of-interest changes and/or transitions;
    causing, at least in part, a mapping of the one or more point-of-interest changes and/or transitions to one or more mapped visual representations based on the status information and the one or more representation objects,
        wherein the one or more mapped visual representations include a color change, a transparency change, a scale change, an additional text, one or more icons, a distortion, an animation, or a combination thereof that are based on the one or more of the ownership change, the corporate information change, the closing or opening status change of the one or more points of interest, or a combination thereof, and
    causing, at least in part, a presentation on at least one point-of-interest user interface of the one or more mapped visual representations regarding the at least one point-of-interest change associated with the at least one of the one or more points of interest which is undergoing changes or had undergone recent development.

2. A method of claim 1, further comprising:
    receiving, utilizing at least one interface, initial status information associated with the one or more points of interest from the one or more public permit databases and/or one or more other sources; and comparing the initial status information with the status information to determine a past, current or future point-of-interest status.

3. A method of claim 1, wherein the status information is augmented prior to processing with other public information, corporate information, crowd source data, network information, or a combination thereof.

4. A method of claim 1, wherein the one or more public permit databases include, at least in part, building permit data captured from one or more building permits.

5. A method of claim 1, further comprising:
processing the status information using one or more machine learning mechanisms to determine the one or more point-of-interest changes.

6. A method of claim 1, wherein the one or more visual representations are presented as one or more interactive user interface elements in the at least one point-of-interest user interface, the method further comprising:
causing, at least in part, a presentation of information related to the one or more point-of-interest changes based, at least in part, on one or more user interactions with the one or more interactive user interface elements.

7. A method of claim 1, further comprising:
determining temporal data associated with the one or more point-of-interest changes,
wherein the generation of the one or more visual representations, the presentation of the one or more visual representations, or a combination thereof is based, at least in part, on the temporal data.

8. A method of claim 7, further comprising:
determining other temporal data associated with at least one viewing time of the one or more representations, the at least one point-of-interest user interface, or a combination thereof,
wherein the generation of the one or more visual representations, the presentation of the one or more visual representations, or a combination thereof is further based, at least in part, on the other temporal data.

9. A method of claim 1, wherein the one or more point-of-interest changes include, at least in part, an indication of a same state, a closed state, a newly opened state, or a combination thereof.

10. An apparatus for presenting one or more visual representations for conveying information about at least one point-of-interest change, the apparatus comprising:
at least one processor; and
at least one memory including computer program code for one or more programs,
the at least one memory and the computer program code configured to, with the at least one processor, cause the apparatus to perform at least the following,
receive status information associated with one or more points of interest from one or more public permit databases, wherein the status information indicates at least one of an ownership change, a corporate information change, a closing or opening status change other than a change in business hours and/or hours of operation, or a combination thereof;
determine, based at least in part on the status information, one or more point-of-interest changes, one or more transitions between the one or more point-of-interest changes, or a combination thereof, wherein the one or more point-of-interest changes and/or transitions include, at least in part, one or more location changes, one or more type changes, one or more operational state changes, or a combination thereof associated with at least one of the one or more points of interest;
cause, at least in part, a generation of one or more representation objects associated with the one or more point-of-interest changes and/or transitions;
cause, at least in part, a mapping of the one or more point-of-interest changes and/or transitions to one or more mapped visual representations based on the status information and the one or more representation objects, wherein the one or more mapped visual representations include a color change, a transparency change, a scale change, an additional text, one or more icons, a distortion, an animation, or a combination thereof that are based on the one or more of the ownership change, the corporate information change, the closing or opening status change of the one or more points of interest, or a combination thereof; and
cause, at least in part, a presentation on at least one point-of-interest user interface of the one or more mapped visual representations regarding the at least one point-of-interest change associated with the at least one of the one or more points of interest which is undergoing changes or had undergone recent development.

11. An apparatus of claim 10, wherein the apparatus is further configured to:
receive, utilizing at least one interface, initial status information associated with the one or more points of interest from the one or more public permit databases and/or one or more other sources; and
compare the initial status information with the status information to determine a past, current or future point-of-interest status,
wherein the status information is augmented prior to processing with other public information, corporate information, crowd source data, network information, or a combination thereof.

12. An apparatus of claim 10, wherein the apparatus is further configured to:
process the status information using one or more machine learning mechanisms to determine the one or more point-of-interest changes.

13. An apparatus of claim 10, wherein the one or more visual representations are presented as one or more interactive user interface elements in the at least one point-of-interest user interface, the apparatus being further configured to:
cause, at least in part, a presentation of information related to the one or more point-of-interest changes based, at least in part, on one or more user interactions with the one or more interactive user interface elements.

14. An apparatus of claim 10, wherein the apparatus is further configured to:
determine temporal data associated with the one or more point-of-interest changes,
wherein the generation of the one or more visual representations, the presentation of the one or more visual representations, or a combination thereof is based, at least in part, on the temporal data.

15. An apparatus of claim 14, wherein the apparatus is further configured to:

determine other temporal data associated with at least one viewing time of the one or more visual representations, the at least one point-of-interest user interface, or a combination thereof,
  wherein the generation of the one or more visual representations, the presentation of the one or more visual representations, or a combination thereof is further based, at least in part, on the other temporal data.

16. A non-transitory computer-readable storage medium carrying one or more sequences of one or more instructions which, when executed by one or more processors, cause an apparatus for presenting one or more visual representations for conveying information about at least one point-of-interest change to at least perform the following steps:
  receiving status information associated with one or more points of interest from one or more public permit databases, wherein the status information indicates at least one of an ownership change, a corporate information change, a closing or opening status change other than a change in business hours and/or hours of operation, or a combination thereof;
  determining, based at least in part on the status information, one or more point-of-interest changes, one or more transitions between the one or more point-of-interest changes, or a combination thereof, wherein the one or more point-of-interest changes and/or transitions include, at least in part, one or more location changes, one or more type changes, one or more operational state changes, or a combination thereof associated with at least one of the one or more points of interest;
  causing, at least in part, a generation of one or more representation objects associated with the one or more point-of-interest changes and/or transitions;
  causing, at least in part, a mapping of the one or more point-of-interest changes and/or transitions to one or more mapped visual representations based on the status information and the one or more representation objects, wherein the one or more mapped visual representations include a color change, a transparency change, a scale change, an additional text, one or more icons, a distortion, an animation, or a combination thereof that are based on the one or more of the ownership change, the corporate information change, the closing or opening status change of the one or more points of interest, or a combination thereof; and
  causing, at least in part, a presentation on at least one point-of-interest user interface of the one or more mapped visual representations regarding the at least one point-of-interest change associated with the at least one of the one or more points of interest which is undergoing changes or had undergone recent development.

17. A non-transitory computer-readable storage medium of claim 16, wherein the apparatus is further caused to perform:
  receiving, utilizing at least one interface, initial status information associated with the one or more points of interest from the one or more public permit databases and/or one or more other sources; and
  comparing the initial status information with the status information to determine a past, current or future point-of-interest status.

* * * * *